(12) United States Patent
Shyam et al.

(10) Patent No.: US 11,180,839 B2
(45) Date of Patent: Nov. 23, 2021

(54) HEAT TREATMENTS FOR HIGH TEMPERATURE CAST ALUMINUM ALLOYS

(71) Applicants: UT-Battelle, LLC, Oak Ridge, TN (US); Nemak USA, Inc., Southfield, MI (US); FCA US LLC, Auburn Hills, MI (US)

(72) Inventors: Amit Shyam, Knoxville, TN (US); James A. Haynes, Knoxville, TN (US); Jose Alejandro Gonzalez Villarreal, Garcia (MX); Andres Fernando Rodriguez-Jasso, Garcia (MX); Gregg Thomas Black, Wayne County, MI (US); Christopher Randall Glaspie, Oakland County, MI (US); Seyed M. Mirmiran, Auburn Hills, MI (US)

(73) Assignees: UT-Battelle, LLC, Oak Ridge, TN (US); Nemak USA, Inc., Southfield, MI (US); FCA US LLC, Auburn Hills, MI (US)

( * ) Notice: Subject to any disclaimer, the term of this patent is extended or adjusted under 35 U.S.C. 154(b) by 47 days.

(21) Appl. No.: 16/171,201

(22) Filed: Oct. 25, 2018

(65) Prior Publication Data
US 2019/0127833 A1 May 2, 2019

Related U.S. Application Data

(60) Provisional application No. 62/577,324, filed on Oct. 26, 2017.

(51) Int. Cl.
*C22F 1/057* (2006.01)
*C22C 21/12* (2006.01)
(Continued)

(52) U.S. Cl.
CPC ............. *C22F 1/057* (2013.01); *B22D 27/04* (2013.01); *C22C 1/026* (2013.01); *C22C 21/12* (2013.01);
(Continued)

(58) Field of Classification Search
CPC ............. C22F 1/057; C22F 1/04–057; C22C 21/12–18
See application file for complete search history.

(56) References Cited

U.S. PATENT DOCUMENTS

| 1,744,545 A | 1/1930 | Hall et al. |
| 2,706,680 A | 4/1955 | Criner |

(Continued)

FOREIGN PATENT DOCUMENTS

| EP | 1 727 921 B1 | 12/2006 |
| EP | 0 348 179 | 7/2016 |

(Continued)

OTHER PUBLICATIONS

Davis, J.R. "Aluminum and Aluminum Alloys", ASM International, p. 309-310. (Year: 1993).*

(Continued)

*Primary Examiner* — George Wyszomierski
*Assistant Examiner* — Janell C Morillo
(74) *Attorney, Agent, or Firm* — Klarquist Sparkman, LLP (57) ABSTRACT

Disclosed herein are embodiments of an aging heat treatment that can be used to replace conventional aging steps when making alloy embodiments of the present disclosure. Embodiments of the disclosed aging heat treatment reduce cost and complexity in producing aluminum alloy-based components while also promoting and/or improving microstructure stability of the aluminum alloys.

19 Claims, 4 Drawing Sheets (51) Int. Cl.
  *C22C 21/14* (2006.01)
  *C22C 21/16* (2006.01)
  *B22D 27/04* (2006.01)
  *C22C 1/02* (2006.01)
  *F16J 1/01* (2006.01)
  B22F 1/00 (2006.01)

(52) U.S. Cl.
  CPC .............. *C22C 21/14* (2013.01); *C22C 21/16* (2013.01); *F16J 1/01* (2013.01); *B22F 1/0003* (2013.01); *C21D 2211/004* (2013.01); *C21D 2221/00* (2013.01)

(56) References Cited

U.S. PATENT DOCUMENTS

| | | | |
|---|---|---|---|
| 2,781,263 | A | 2/1957 | Gresham et al. |
| 2,784,126 | A | 3/1957 | Criner |
| 3,826,688 | A * | 7/1974 | Levy .................. C22F 1/057 148/552 |
| 5,120,372 | A | 6/1992 | Chia et al. |
| 6,074,498 | A | 6/2000 | Waldron et al. |
| 2005/0269000 | A1 | 12/2005 | Denzer et al. |
| 2011/0036472 | A1* | 2/2011 | Carsley .................. C22F 1/047 148/698 |
| 2014/0224385 | A1* | 8/2014 | Yang .................. B22D 17/203 148/549 |
| 2016/0168665 | A1 | 6/2016 | Rafetzeder |
| 2017/0335437 | A1 | 11/2017 | Shyam et al. |
| 2017/0362690 | A1* | 12/2017 | Rafetzeder ........... B22D 21/007 |

FOREIGN PATENT DOCUMENTS

| | | |
|---|---|---|
| EP | 3 072 985 | 9/2016 |
| JP | H07 252574 | 10/1995 |
| WO | WO 2005/098072 | 10/2005 |
| WO | WO 2007/106772 | 9/2007 |
| WO | WO 2008/072972 | 6/2008 |
| WO | WO 2014/167191 | 10/2014 |
| WO | WO 2016/116805 | 7/2016 |
| WO | WO 2017/201403 | 11/2017 |
| WO | WO 2018/209095 | 11/2018 |

OTHER PUBLICATIONS

NIST webpage: www.nist.gov/pml/weights-and-measures/si-units-temperature. (Year: 2021).*
International Search Report and Written Opinion issued for International Application No. PCT/US2018/057588 dated Jan. 21, 2019.
Non-Final Office Action issued for U.S. Appl. No. 15/160,926 dated Jul. 25, 2019.
Hatch, "Properties and Physical Metallurgy: Specific Alloying Elements and Impurities," in *Aluminum: Properties and Physical Metallurgy*, published by ASM International, Jan. 1, 1984, p. 224.
Non-Final Office Action issued for U.S. Appl. No. 15/594,434 dated Apr. 16, 2020.
Final Office Action issued for U.S. Appl. No. 15/160,926 dated Nov. 8, 2019, 11 pages.
Final Office Action issued for U.S. Appl. No. 15/594,434 dated Oct. 20, 2020, 8 pages.
Non-Final Office Action issued for U.S. Appl. No. 15/160,926 dated Sep. 8, 2020, 10 pages.
American Foundry Society, "Advancing Aluminum," *Modern Casting*, pp. 45-50, Mar. 2015.
International Search Report and Written Opinion issued for International Application No. PCT/US2017/033535 dated Jul. 19, 2017 (12 pages).
International Search Report and Written Opinion issued for International Application No. PCT/US2018/032077 dated Jun. 29, 2018 (14 pages).
Schmitz et al., "Surface tension of liquid Al—Cu binary alloys", *Int. J. Mat. Res.*, 100(11): Nov. 2009.

* cited by examiner

HEAT TREATMENTS FOR HIGH TEMPERATURE CAST ALUMINUM ALLOYS

CROSS REFERENCE TO RELATED APPLICATION

This application claims the benefit of U.S. Provisional Patent Application No. 62/577,324, filed on Oct. 26, 2017, which is hereby incorporated by reference.

ACKNOWLEDGMENT OF GOVERNMENT SUPPORT

This invention was made with government support under Contract No. DE-AC05-00OR22725 awarded by the U.S. Department of Energy. The government has certain rights in the invention.

FIELD

Disclosed herein are embodiments of a heat treatment method for aluminum alloys having unique microstructural characteristics.

PARTIES TO JOINT RESEARCH AGREEMENT

The research work described here was performed under a Cooperative Research and Development Agreement (CRADA) between UT-Battelle, LLC, Chrysler Group LLC, and Nemak USA Inc.

BACKGROUND

Cast aluminum alloys are used extensively in various industries, such as for automobile powertrain components. Among materials for these components, the aluminum alloys for engine cylinder head applications have a unique combination of physical, thermal, mechanical and castability requirements. Government regulations require increased vehicle efficiency and have pushed the maximum operating temperature of cylinder heads to approximately 250° C. It is projected that this temperature will need to increase to 300° C. to meet the demand of future vehicular efficiency requirements, particularly CAFE 2025 standards. Conventional aluminum alloys cannot economically address the requirements of cylinder heads operating at 300° C. The widely used alloys for cylinder heads, such as 319 and A356, are not able to meet the temperature and microstructure/strength stability requirements at temperatures greater than 250° C. A need exists in the art for cost effective methods of making aluminum alloys having unique microstructures that exhibit high temperature stability.

SUMMARY

Disclosed herein are embodiments of a method, comprising: exposing an aluminum alloy to an aging heat treatment selected from (a) an in situ aging treatment; (b) a short term aging treatment; (c) an incremental aging treatment wherein the aluminum alloy is aged by exposing the aluminum alloy to increasing temperatures over a period of time; (d) a multi-temperature aging treatment; or (e) any combination of (a) through (d). In some embodiments, the method further comprises solution treating the composition at a temperature ranging from 525° C. to 550° C. and/or quenching the composition.

Also disclosed herein are embodiments of an aluminum alloy having a first microstructural zone comprising a fine microstructure and a second microstructural zone comprising a coarse microstructure.

The foregoing and other objects and features of the present disclosure will become more apparent from the following detailed description, which proceeds with reference to the accompanying figures.

DETAILED DESCRIPTION

I. Explanation of Terms

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

The following terms and definitions are provided:

Alloy: A metal made by melting and mixing two or more different metals. For example, an aluminum alloy is a metal made by combining aluminum and at least one other metal. In some instances, an alloy is a solid solution of metal elements.

Aging: A process used to increase the strength of alloys by the nucleation and growth of precipitates at elevated temperature (also called aging temperature) for a period of time (also called aging time).

Hot Tearing: A type of alloy casting defect that involves forming an irreversible failure (or crack) in the cast alloy as the cast alloy cools. Hot tearing may produce cracks on the surface or inside the cast alloy. Often a main tear and numerous smaller branching tears following intergranular paths are present.

Figure 1:
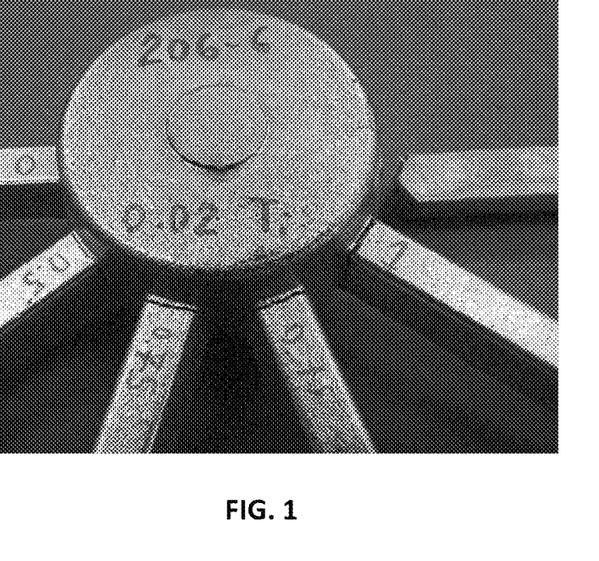
FIG. 1 is a photographic image of representative castings used to evaluate hot tearing susceptibility of alloys described herein.

Hot Tearing (Index) Value: As used herein, this term refers to a numerical rating. In some embodiments, alloys were cast in the shape shown in FIG. 1. Each casting was examined and given a hot tearing rating number. This numerical rating value was obtained by examining each arm, and assigning a value between 0 and 1 according to the following scheme: 1 point for a fully broken arm; 0.75 points for a severe tear (arm fully cracked but still strongly attached to the central section); 0.5 points for a visible tear (arm not fully cracked); 0.25 points for a tear detectable only under magnifying glass (5× to 10× magnification); and 0.0 points when no cracks were present under 5× to 10× magnification. The number for each arm was summed to give a total for each casting. The numerical rating was between zero (no observed cracks) and six (all arms broken). In some examples, an average value from five arms was reported as the hot tear index value.

Incremental Aging Treatment: An aging treatment that can be used with alloy embodiments of the present disclosure, wherein the alloy is exposed to incrementally increasing aging temperatures over a time period.

In Situ Aging Treatment: An aging treatment that can be used with alloy embodiments of the present disclosure in lieu of a pre-use aging treatment. In particular embodiments, an in situ aging treatment comprises exposing an alloy, typically after the alloy has been cast, to heat by using the alloy during its intended use. For example, a cast engine component formed with a representative alloy embodiment can be used in an environment that produces high temperatures, such as an engine, and during such use can be aged in situ.

Multi-temperature Aging Treatment: An aging treatment that can be used with alloy embodiments of the present disclosure, wherein the alloy is exposed to at least two different temperatures (e.g., a first and second temperature) simultaneously, sequentially, or substantially simultaneously such that at least a portion of alloy is exposed to a temperature higher than the other temperature to which the alloy is exposed.

Pre-use Aging Treatment: An aging treatment, separate from a solution and/or quenching treatment that is used on an alloy prior to using a component made from the alloy.

Representative Alloy Composition(s): This term refers to inventive alloys contemplated by the present disclosure.

Short Term Aging Treatment: An aging treatment that can be used with alloy embodiments of the present disclosure, wherein the alloy is exposed to a temperature above 300° C. for a time period that typically is less than 5 hours.

Solution Treating/Treatment: Heating an alloy at a suitable temperature and holding it at that temperature long enough to cause one or more alloy composition constituents to enter into a solid solution to achieve a homogenous (or substantially homogenous) solid solution and then cooling the alloy in a rapid manner (e.g., air/water quench) so as to hold the alloy composition constituents in solution.

Simultaneously: When used with reference to a multi-temperature aging treatment embodiment disclosed herein, the term "simultaneously" includes embodiments where the alloy is heated at two different temperatures at the same time or at substantially the same time.

Vickers Hardness Test: A test used to determine the hardness of an alloy, wherein hardness relates to the resistance of the alloy to indentation. Vickers hardness can be determined by measuring the permanent depth of an indentation formed by a Vickers Hardness tester, such as by measuring the depth or the area of an indentation formed in the alloy using the tester. Methods of conducting a Vickers hardness test are disclosed herein.

II. Introduction

Disclosed herein are method embodiments for heat treating unique cast aluminum alloy compositions exhibiting elevated temperature microstructural stability and corresponding mechanical properties, as well as improved hot tearing resistance. The alloy compositions disclosed herein are based on an alloy design approach that entails incorporating coarse and yet coherent θ' precipitates that enable improved elevated temperature microstructural stability and mechanical properties. The alloy design approach disclosed herein is contrary to the conventional wisdom and approach of incorporating fine strengthening precipitates. In conventional designs and methods, the fine strengthening precipitates lead to suitable mechanical properties at lower temperatures, but the precipitates coarsen rapidly at temperatures above 250° C. and also lose their coherency with the matrix. One unique aspect of certain embodiments of the alloys disclosed herein is the coarse strengthening precipitates, which remain stable and coherent with the matrix at high temperatures (such as up to or above 350° C.). Heat treatment methods disclosed herein can be used to attain these structures and/or improve their stability and at the same time reduce cost and complexity of alloy production. These precipitates lead to suitable mechanical properties at lower temperature, but at elevated temperatures their mechanical and thermal properties are exceptional and much more stable than conventional alloys. Without being limited to a particular theory, it is currently believed that the elevated temperature microstructural stability of certain of the alloys compositions disclosed herein can be attributed to the selective microsegregation of alloying elements in the bulk as well as coherent/semi-coherent interfaces of θ' precipitates. This microsegregation can "freeze" the precipitates into low energy states that renders them exceptionally stable to thermal exposure at high temperatures.

Certain embodiments of the alloy compositions disclosed herein also exhibit improved hot tearing resistance as compared to conventional alloys known in the art, such as resistance to hot tearing when the alloy cools from a melt to ambient temperature or from a hot temperature of use (e.g., 300° C.) to ambient temperature. Hot tearing susceptibility is a problem that plagues industries where intricate components and/or component designs are used, such as the automotive, aircraft, and aerospace industries. For example, many engine components must be able to resist hot tearing during production. The inventors have discovered that certain of the alloy compositions disclosed herein exhibit surprisingly superior hot tearing resistance as compared to conventional alloys. For example, some conventional alloys were found to have hot tearing values greater than 3.5 (on a scale of 0-6), whereas certain of the disclosed embodiments had hot tearing values less than or equal to 2.5. In certain embodiments, the hot tearing index value is as low as 0.5. In some embodiments, the inventors have discovered that hot tearing susceptibility can be substantially reduced and even eliminated (0%) by using alloys having the features and compositions described herein.

The disclosed aluminum alloy compositions also can be exposed to embodiments of an efficient heat treatment method that cannot be used with conventional alloys due to their lack of the unique, stable microstructures of the disclosed aluminum alloy compositions. Embodiments of the heat treatment method reduce cost of alloy processing and further improve the performance of components made from alloy embodiments disclosed herein. In particular embodiments, unique aging methods can be used that do not deleteriously affect, and even can improve, the stability of the disclosed aluminum alloy's microstructural features. Without being limited to a particular theory, it currently is believed that the aging treatment embodiments disclosed herein can reduce structural changes in the alloy's microstructure, which can result in dimensional stability during operation of components made with the alloy. This stability can, in turn, reduce the internal residual stresses created in the components once they are heat cycled. This can be particular useful when the alloy is used to make components for use in the automobile industry, such as cylinder heads.

III. Alloy Embodiments

Disclosed herein are aluminum alloy compositions. The disclosed aluminum alloy compositions can be used to make cast aluminum alloys exhibiting microstructural stability and strength at high temperatures, such as the high temperatures associated with components used in automobiles, aerospace, and the like. Accordingly, the aluminum alloy compositions disclosed herein are able to meet the thermal, mechanical, and castability requirements in engine component manufacturing and use. Some embodiments of the disclosed aluminum alloy compositions are also suitable for other uses including, but not limited to, additive manufacturing, alloy powders, welding/fusion joining, and laser cutting/welding. In particular disclosed embodiments, the aluminum alloy compositions disclosed herein are made using an alloy design approach that includes incorporating coarse and yet coherent θ' precipitates that enable improved elevated temperature (such as 350° C.) microstructural stability and mechanical properties. By "coarse" is meant a disk diameter >500 nm. A fine precipitate has a disk diameter <100 nm. Diameters of 100-500 nm are considered to be between coarse and fine. In particular disclosed embodiments, the cast aluminum alloys exhibit microstructural stability and strength at temperatures above 300° C., such as 325° C., 350° C., or higher. The aluminum alloy compositions and cast aluminum alloys described herein exhibit improved microstructural stability, strength, and/or castability as compared to alloys known/used in the art, such as 319, 206 alloys and RR350 alloys. Also disclosed herein are embodiments of an alloy that comprises dual microstructural features, such as a first microstructural zone that comprises a microstructure having features different from that of a second microstructure contained within a second microstructural zone. In some embodiments, the alloy can comprise two or more microstructural zones. The microstructural zones can comprise a majority of the regions with lower temperature heat treatment to obtain improved low temperature strength. Regions which will see elevated temperature can receive a localized short term heart treatment, which can provide a coarser, stable microstructure. An example of such a region would be the combustion chamber of the cylinder head in an automobile engine. The alloy composition embodiments and process method embodiments disclosed herein provide alloys that exhibit properties that are surprisingly unexpected and contrary to properties observed for traditional alloys comprising fine strengthening precipitates. In some embodiments, the alloys disclosed herein comprise amounts of components that are contrary to conventional wisdom.

Embodiments of the aluminum alloy compositions described herein can comprise aluminum (Al), copper (Cu), zirconium (Zr), titanium (Ti), manganese (Mn), silicon (Si), iron (Fe), nickel (Ni), magnesium (Mg), cobalt (Co), antimony (Sb), vanadium (V), and combinations thereof. In some disclosed embodiments, the aluminum alloy compositions consist essentially of (i) aluminum (Al), copper (Cu), zirconium (Zr), titanium (Ti), manganese (Mn), and optionally, (ii) silicon (Si), iron (Fe), nickel (Ni), magnesium (Mg), cobalt (Co), antimony (Sb), and combinations thereof. In some disclosed embodiments, the aluminum alloy compositions consist essentially of aluminum (Al), copper (Cu), zirconium (Zr), manganese (Mn), silicon (Si), iron (Fe), nickel (Ni), magnesium (Mg), cobalt (Co), and antimony (Sb). "Consists essentially of" means that the alloys do not comprise, or are free of, additional components that affect one or more physical characteristics (i.e., change a numerical value of the physical characteristic by more than 5% relative to the value in the absence of the impurity or component), such as the microstructural stability and/or strength of the cast alloy composition or the hot tearing susceptibility obtained from this combination of components. Such embodiments consisting essentially of the above-mentioned components can include impurities and other components that do not materially affect the physical characteristics of the aluminum alloy composition, but those impurities and other components that do markedly alter the physical characteristics, such as the microstructural stability, strength, hot tearing, and/or other properties that affect performance at high temperatures, are excluded. For example, when the alloy includes titanium, the alloy may further include boron in an amount ranging from 0.15×the amount of titanium present to 0.4×the amount of titanium present, or carbon in an amount of from 0.2×the amount titanium present to 0.3×the amount of titanium present. In yet additional embodiments, the aluminum alloy compositions described herein can consist of (i) aluminum (Al), copper (Cu), zirconium (Zr), and manganese (Mn), and optionally (ii) silicon (Si), iron (Fe), nickel (Ni), magnesium (Mg), cobalt (Co), antimony (Sb), and combinations thereof.

As indicated above, the disclosed aluminum alloy compositions comprise manganese. In particular disclosed embodiments, manganese facilitates alloying addition, particularly in embodiments comprising low silicon amounts (e.g., where silicon is present in an amount of less than 0.1 wt %). The manganese utilized in the disclosed alloys partitions in the strengthening precipitates and also to the interfaces. Even at low amounts, manganese facilitates the segregation to the interfaces leading to desirable high temperature stability.

Use of zirconium in the disclosed alloys also can facilitate microalloying, which can involve the addition of another element in small amounts, such as 0.5 wt % or less. In particular disclosed embodiments, using low amounts of zirconium (e.g., 0.05-0.15 wt %) in combination with manganese can stabilize the interface to higher temperature. Without being limited to a particular theory of operation, it is currently believed that combining the manganese and zirconium can lower the interfacial energy synergistically and also act as double diffusion barriers on the precipitate-matrix interfaces. In some embodiments, zirconium atoms are located on the matrix side and manganese atoms are located on the precipitate side of this interface.

When titanium is used in the disclosed alloys, it can be located at sites similar to the zirconium, but typically is less effective as a high temperature stabilizer on its own (that is, when not used in combination with zirconium). The effectiveness of the titanium can be improved by adding additional titanium in conjunction with boron, such as by adding a grain refiner to the alloy composition. In some embodiments, using a grain refiner comprising titanium and boron can result in the addition of up to 0.07 wt % boron, such as ≤0.067 wt % boron, ≤0.04 wt % boron, ≤0.033 wt % boron, or ≤0.02 wt % boron. The amount of titanium added from introducing the grain refiner is discussed below. In some embodiments, the grain refiner is the only source of titanium in the alloy. The presence of a grain refiner can be detected by analyzing the alloy for additional components of the grain refiner, e.g., boron.

The amount of each compositional component that can be used in the disclosed aluminum alloy compositions is described. In some embodiments, the amount of copper present in the compositions can range from 3 wt % to 8 wt %, such as 3.5 wt % to 7.5 wt %, or 4 wt % to 7 wt %, or 4.5 wt % to 6.5 wt %, or 5 wt % to 6 wt %, or 5.5 wt % to 8 wt %. In particular disclosed embodiments, the amount of copper present in the aluminum alloy composition can be selected from 3 wt %, 3.5 wt %, 4 wt %, 4.5 wt %, 5 wt %, 5.5 wt %, 6 wt %, 6.5 wt %, 7 wt %, 7.5 wt %, or 8 wt %.

In yet additional embodiments, the amount of copper present in the alloys can range from 7 wt % to 25 wt % or >7 wt % to 25 wt %, such as 8 wt % to 22 wt %, >8 wt % to 20 wt %, >8 wt % to 18 wt %, 8 wt % to 15 wt %, >8 wt % to 15 wt %, 8.5 wt % to 25 wt %, 8.5 wt % to 20 wt %, 8.5 wt % to 18 wt %, 8.5 wt % to 15 wt %, 9 wt % to 25 wt %, 9 wt % to 20 wt %, 9 wt % to 18 wt %, or 9 wt % to 15 wt %. In particular disclosed embodiments, the amount of copper present in the aluminum alloy composition can be selected from 7 wt %, 7.3 wt %, 8 wt %, 8.5 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22, wt %, 23 wt %, 24 wt %, or 25 wt %. In some embodiments, when the amount of copper is 8 wt % or 8.0-8.4 wt %, the alloy includes from 0 wt % to less than 0.05 wt % titanium, such as from 0 wt % to less than 0.045 wt %, from 0 wt % to less than 0.04 wt %, or from 0 wt % to less than 0.03 wt % titanium.

In some embodiments, the amount of zirconium present in the alloys can range from 0.05 wt % to 0.3 wt %, such as 0.05 wt % to 0.25 wt %, 0.05 wt % to 0.2 wt %, or 0.05 wt % to 0.15 wt %. In particular disclosed embodiments, the amount of zirconium present in the alloys can be selected from 0.05 wt %, less than 0.07 wt %, 0.1 wt %, 0.15 wt %, 0.19 wt %, 0.2 wt %, 0.25 wt %, or 0.3 wt %.

In additional embodiments, the amount of titanium present in the alloys can range from 0 wt % to 0.3 wt %, such as greater than 0 wt % to 0.3 wt %, 0 wt % to 0.2 wt %, 0.02 wt % to 0.2 wt %, 0 wt % to less than 0.2 wt %, 0 wt % to 0.15 wt %, 0 wt % to 0.1 wt %, 0 wt % to 0.05 wt % 0 wt % to 0.045 wt %, 0 wt % to 0.04 wt %, 0 wt % to 0.03 wt %, 0 wt % to 0.02 wt %. In particular disclosed embodiments, the amount of titanium present in the alloys can be selected from 0.2 wt %, 0.15 wt %, 0.1 wt %, ≤0.05 wt %, ≤0.045 wt %, ≤0.04 wt %, ≤0.03 wt %, ≤0.02 wt %, ≤0.01 wt %, or 0 wt %.

Elemental titanium may be added to the alloy and/or titanium may be added by a grain refiner. In one embodiment, titanium is added to the alloy. In one embodiment, titanium is added to the alloy, and a grain refiner provides the alloy with additional titanium. In an independent embodiment, the grain refiner is the only source of titanium in the alloy. In still another independent embodiment, the alloy is devoid of, essentially devoid of (i.e., contains ≤0.03 wt %), or substantially devoid of (≤0.045 wt %) titanium. In certain embodiments, the amount of titanium is from greater than 0 wt % to 0.2 wt %, and the alloy further comprises (i) boron in an amount of from 0.15×the amount of titanium present to 0.4×the amount of titanium present, or (ii) carbon in an amount of from 0.2×the amount of titanium present to 0.3×the amount of titanium present. In particular embodiments, the alloy further comprises boron in an amount of from 0.2×the amount of titanium present to 0.33×the amount of titanium present, or carbon in an amount of 0.25×the amount of titanium present. The source of titanium (e.g., elemental titanium or a grain refiner) can be determined by performing an elemental analysis of the alloy to determine whether other components of a grainer refiner, such as boron or carbon, are present. Presence of boron or carbon, particularly in an amount corresponding to a ratio of titanium to boron or carbon in a grain refiner, provides evidence that a grain refiner was added to the alloy.

In some embodiments, the amount of manganese present in the alloys can range from 0.05 wt % to 1 wt %, such as 0.1 wt % to 0.75 wt %, 0.2 wt % to 0.5 wt %, 0.2 wt % to 0.48 wt %, 0.3 wt % to 0.4 wt %, 0.1 wt % to 0.3 wt %, or 0.05 wt % to less than 0.2 wt %. In particular disclosed embodiments, the amount of manganese present in the alloys can be selected from 0.05 wt %, 0.1 wt %, less than 0.2 wt %, 0.2 wt %, 0.3 wt %, 0.4 wt %, 0.45 wt %, 0.48 wt %, 0.5 wt %, or 0.75 wt %.

In some embodiments, the amount of silicon present in the alloys can range from 0 wt % to 0.2 wt %, such as greater than 0 wt % to less than 0.2 wt %; ≤0.15 wt %, such as greater than 0 wt % to 0.15 wt %; ≤0.1 wt %, such as 0.01 wt % to 0.1 wt %, 0.01 wt % to 0.08 wt %, 0.01 wt % to 0.05 wt %, 0.01 wt % to 0.04 wt %, 0.01 wt % to 0.03 wt %, or 0.01 wt % to 0.02 wt %. In particular disclosed embodiments, the amount of silicon present in the alloys can be selected from 0 wt %, 0.01 wt %, 0.02 wt %, 0.03 wt %, 0.04 wt %, 0.05 wt %, 0.06 wt %, 0.07 wt %, 0.08 wt %, 0.09 wt %, or 0.1 wt %.

In some embodiments, the amount of iron present in the alloys can range from 0 wt % to 0.5 wt %, such as greater than 0 wt % to less than 0.5 wt %, greater than 0 wt % to less than 0.2 wt %, greater than 0 wt % to 0.15 wt %, greater than 0 wt % to 0.1 wt %, greater than 0 wt % to 0.07 wt %, greater than 0 wt % to 0.05 wt %, or 0.05 wt % to ≤0.2 wt %. In particular disclosed embodiments, the amount of iron present in the alloys can be selected from 0.2 wt %, 0.15 wt %, 0.1 wt %, 0.07 wt %, or 0.05 wt %. In additional embodiments, the amount of iron present in the compositions can range from 0 wt % to 0.2 wt %, such as greater than 0 wt % to less than 0.2 wt %, or greater than 0 wt % to 0.15 wt %, or greater than 0 wt % to 0.1 wt %, or greater than 0 wt % to 0.05 wt %, or 0.05 wt % to less than 0.2 wt %.

In some embodiments, the amount of nickel present in the compositions can range from 0 wt % to 0.01 wt %, such as greater than 0 wt % to less than 0.01 wt %, or greater than 0 wt % to 0.0075 wt %, or greater than 0 wt % to 0.005 wt %, or greater than 0 wt % to 0.0025 wt %, or 0.0025 wt % to less than 0.01 wt %. In particular disclosed embodiments, the amount of nickel present in the compositions can be selected from 0 wt %, 0.0025 wt %, 0.005 wt %, 0.0075 wt %, or 0.01 wt %.

In some embodiments, the amount of magnesium present in the compositions can range from 0 wt % to 0.01 wt %, such as greater than 0 wt % to less than 0.01 wt %, or greater than 0 wt % to 0.0075 wt %, or greater than 0 wt % to 0.005 wt %, or greater than 0 wt % to 0.0025 wt %, or 0.0025 wt % to less than 0.01 wt %. In particular disclosed embodiments, the amount of magnesium present in the compositions can be selected from 0 wt %, 0.0006 wt %, 0.0025 wt %, 0.005 wt %, 0.0075 wt %, or 0.01 wt %.

In some embodiments, the amount of cobalt present in the compositions can range from 0 wt % to 0.1 wt %, such as greater than 0 wt % to less than 0.1 wt %, or greater than 0 wt % to 0.08 wt %, or 0.01 wt % to 0.07 wt %, or 0.01 wt % to 0.06 wt %, or 0.01 wt % to 0.05 wt %, or 0.01 wt % to 0.04 wt %, or 0.01 wt % to 0.03 wt %, or 0.01 wt % to 0.02 wt %. In particular disclosed embodiments, the amount of cobalt present in the compositions can be selected from 0 wt %, 0.01 wt %, 0.02 wt %, 0.03 wt %, 0.04 wt %, 0.05 wt %, 0.06 wt %, 0.07 wt %, 0.08 wt %, 0.09 wt %, or 0.1 wt %.

In some embodiments, the amount of antimony present in the compositions can range from 0 wt % to 0.1 wt %, such as greater than 0 wt % to less than 0.1 wt %, or greater than 0 wt % to 0.08 wt %, or 0.01 wt % to 0.07 wt %, or 0.01 wt % to 0.06 wt %, or 0.01 wt % to 0.05 wt %, or 0.01 wt % to 0.04 wt %, or 0.01 wt % to 0.03 wt %, or 0.01 wt % to 0.02 wt %. In particular disclosed embodiments, the amount of antimony present in the compositions can be selected from 0 wt %, 0.01 wt %, 0.02 wt %, 0.03 wt %, 0.04 wt %, 0.05 wt %, 0.06 wt %, 0.07 wt %, 0.08 wt %, 0.09 wt %, or 0.1 wt %.

The amount of aluminum present in the alloys is the balance (or remainder) wt % needed to achieve 100 wt % with other components, and in such embodiments, there may be unavoidable impurities present in the alloy, wherein the total content of impurities amounts to no more than 0.2 wt %, such as 0 to 0.15 wt %, 0 to 0.1 wt %, or 0 to 0.5 wt %. In some embodiments, the amount of aluminum present in the composition can range from 80 wt % to 98 wt %, such as 80 wt % to 95 wt %, or 85 wt % to 92 wt %, or 90 wt % to 92 wt %, or 85 wt % to 93 wt %. In additional embodiments, the amount of aluminum present in the alloy can range from 72 wt % to 92 wt %, such as 73 wt % to 92 wt %, 74 wt % to 92 wt %, 74 wt % to 91.5 wt %, 75 wt % to 92 wt %, 75 wt % to 91.5 wt %, 80 wt % to 92 wt %, 80 wt % to 91.5 wt %, 85 wt % to 92 wt %, 85 wt % to 91.5 wt %, 85 wt % to 91 wt % or 85 wt % to 90 wt %.

In particular disclosed embodiments, the amount of manganese present in the aluminum alloy compositions is greater than that of the amount of iron present, the amount of zirconium present is greater than that of the amount of titanium, or both such conditions apply. In yet additional embodiments, the amount of manganese present in the aluminum alloy compositions is greater than the amount of silicon present, with particular disclosed embodiments having manganese present in an amount greater than 3 times the amount of silicon present. In particular disclosed embodiments, the amount of silicon included in the alloy is kept to a minimum, with certain embodiments having amounts of silicon lower than 0.2 wt %, such as less than 0.1 wt %, or less than 0.08 wt % or less than 0.05 wt %. The amount of silicon present in the alloys is typically minimized so as to avoid poisoning the precipitate-matrix interface. Higher amounts lead to the formation of the thermodynamically stable phase that can coarsen rapidly leading to a rapid loss in mechanical properties. Si content desirably is <0.1 wt % for best results. In additional embodiments, the amount of magnesium present in the alloys is kept to a minimum. Magnesium, particularly in combination with silicon, is a fast diffusing element that can rapidly partition to the strengthening precipitate and not allow the effective alloying elements, such as manganese and zirconium, to invoke temperature stabilization. Other elements that can constitute impurities include, but are not limited to, iron, cobalt, nickel, and antimony. Iron typically is maintained below a level of 0.2 wt % to avoid forming intermetallics, which can have a detrimental effect on the hot tearing resistance of the disclosed alloys.

Particular disclosed aluminum alloy compositions comprise 3 wt % to 8 wt % copper, 0.1 wt % to 0.3 wt % zirconium, less than 0.2 wt % titanium (before addition of a grain refiner), 0.1 wt % to 0.48 wt % manganese, and the remainder being aluminum. Such embodiments can further comprise less than 0.1 wt % silicon, less than 0.2 wt % iron, less than 0.01 wt % nickel, less than 0.01 wt % magnesium, less than 0.1 wt % cobalt, less than 0.1 wt % antimony, or any combination thereof. In some embodiments, the aluminum alloy compositions can comprise an amount of manganese that is greater than ((0.08*copper (in wt %))−0.14) and the amount of zirconium can be greater than ((0.04*copper (in wt %))−0.08), and wherein the amount of copper ranges from 6-8 wt % and the amount of silicon is less than 0.1 wt %. In some embodiments, the aluminum alloy compositions can comprise manganese in an amount satisfying the formula ((0.04*copper (in wt %))−0.02) where copper ranges from 3 wt % to 8 wt % and the zirconium can be present in an amount satisfying the formula ((0.02*copper (in wt %))−0.01) where copper ranges from 3 wt % to 8 wt %. Such embodiments are particularly suited for providing alloys exhibiting reduced hot tearing susceptibility and/or superior elevated temperature mechanical properties as compared to conventional alloys.

In additional embodiments, the disclosed aluminum alloy compositions comprise 8 wt % to 25 wt % copper, 0.1 wt % to 0.3 wt % zirconium, less than 0.05 wt % titanium (before addition of a grain refiner), 0.1 wt % to 1 wt % manganese, and the remainder being aluminum. Such embodiments can further comprise up to 0.1 wt % silicon, up to 0.2 wt % iron, up to 0.01 wt % nickel, up to 0.01 wt % magnesium, up to 0.1 wt % cobalt, up to 0.1 wt % antimony, or any combination thereof.

In some embodiments, the amount of each component present in the alloy can vary based on the portion of the casting analyzed with, for example, inductively coupled plasma optical emission spectrometry and inductively coupled plasma mass spectrometry. In some embodiments, the alloy casting can comprise an amount of each component matching those described above. In yet additional embodiments, different portions (e.g., an outer surface of a casting, an inner portion of the casting, and the like) of a casting can comprise an amount of each component that substantially matches the amounts described above, wherein "substantially matches" means that the amount of the particular component within the alloy ranges from 80% to 110% of the amounts disclosed herein, such as 85% to 105%, or 90% to 99%, or 90% to 95%.

The aluminum alloy compositions disclosed herein can comprise grain refiners as a compositional constituent. In particular disclosed embodiments, the amount of grain refiner included in the alloy can be greater than, such as one order of magnitude greater than, the amount of grain refiner used in conventional alloys. In some embodiments, the amount of grain refiner included with the alloys can be selected based on a target weight percent of titanium that is to be added to the alloy by introduction of the grain refiner. In such embodiments, the desired amount of additional titanium that is to be added to the alloy is identified and then the amount of the master alloy to be added (typically in kgs) to a specific metal volume to increase the titanium amount by the additional amount is calculated. In particular disclosed embodiments, the amount of the grain refiner that is added can vary with the type of master alloy used.

As indicated above, the grain refiner can contribute to the amount of titanium present in the alloy compositions. For example, using a grain refiner can result in the alloy comprising an additional amount of titanium, such as from greater than zero to 0.2 wt % additional Ti, from 0.02 wt % to 0.2 wt % additional Ti, or from 0.02 wt % to 0.15 wt % additional Ti, or from 0.02 wt % to 0.1 wt % additional Ti. In particular disclosed embodiments, the amount of additional Ti introduced by adding a grain refiner can be 0.02 wt %, 0.1 wt %, or 0.2 wt %. Suitable grain refiners include, but are not limited to grain refiners that facilitate nucleation of new grains of aluminum. Some grain refiners can include, but are not limited to, grain refiners comprising aluminum, titanium, boron, and combinations thereof, which can include master alloys. In particular disclosed embodiments, the grain refiner can be a TiBor master alloy grain refiner, which is a grain refiner comprising a combination of aluminum, titanium, and boron. The grain refiner can comprise titanium in an amount ranging from 2 wt % to 6 wt %, such as 3 wt % to 6 wt %, or 3 wt % to 5 wt %; boron in an amount ranging from 0.5 wt % to 2 wt %, such as 0.5 wt % to 1 wt %, or 0.75 wt % to 1 wt %; and aluminum making up the remainder wt %; and any combination thereof. In exemplary embodiments, the TiBor grain refiner comprises 94 wt % aluminum, 5 wt % titanium, and 1 wt % boron, or 96 wt % aluminum, 3 wt % titanium, and 1 wt % boron. Other grain refiners known in the art can be used in combination with the alloy compositions disclosed herein, such as TiB or TiC, among others. In particular disclosed embodiments, grain refiners can be used to improve the hot tear resistance of the cast aluminum alloy compositions. In particular disclosed embodiments, the hot tear resistance of the cast aluminum alloy compositions can be further improved by using the grain refiners in combination with alloy composition embodiments comprising 8 wt % to 25 wt % copper, >8 wt % to 25 wt % copper, 8.5 wt % to 25 wt % copper, 9 wt % to 25 wt % copper, 8 wt % to 15 wt % copper, >8 wt % to 15 wt % copper, 8.5 wt % to 15 wt % copper, or 9 wt % to 15 wt % copper. Conventionally, when an alloy is referred to as including a particular percentage of grain refiner, the percentage refers to the weight percent of titanium added by the grain refiner. For example, an alloy containing "0.1 wt % TiBor" contains an additional 0.1 wt % titanium provided by TiBor addition.

In exemplary embodiments, the aluminum alloy composition comprises, consist essentially of, or consists of 6.5 wt % copper, 0.2 wt % manganese, 0.15 wt % zirconium, 0.1 wt % titanium, less than 0.2 wt % silicon, less than 0.2 wt % iron, less than 0.01 wt % nickel, less than 0.01 wt % magnesium, less than 0.1 wt % cobalt, less than 0.1 wt % antimony, with aluminum making up the balance, along with 0 wt % to 0.2 wt % unavoidable impurities. In other exemplary embodiments, the aluminum alloy compositions can comprise, consist essentially of, or consist of 6.6 wt % copper, 0.48 wt % manganese, 0.18 wt % zirconium, 0.01 wt % titanium, less than 0.2 wt % silicon, less than 0.2 wt % iron, less than 0.01 wt % nickel, less than 0.01 wt % magnesium, less than 0.1 wt % cobalt, less than 0.1 wt % antimony, with aluminum making up the balance, along with 0 wt % to 0.2 wt % unavoidable impurities. In yet other exemplary embodiments, the aluminum alloy compositions can comprise, consist essentially of, or consist of 6.6 wt % copper, 0.48 wt % manganese, 0.18 wt % zirconium, 0.03 wt % titanium, less than 0.2 wt % silicon, less than 0.2 wt % iron, less than 0.01 wt % nickel, less than 0.01 wt % magnesium, less than 0.1 wt % cobalt, less than 0.1 wt % antimony, with aluminum making up the balance, along with 0 wt % to 0.2 wt % unavoidable impurities. In yet other exemplary embodiments, the aluminum alloy compositions can comprise, consist essentially of, or consist of 6.6 wt % copper, 0.48 wt % manganese, 0.18 wt % zirconium, 0.11 wt % titanium, less than 0.2 wt % silicon, less than 0.2 wt % iron, less than 0.01 wt % nickel, less than 0.01 wt % magnesium, less than 0.1 wt % cobalt, less than 0.1 wt % antimony, with aluminum making up the balance, along with 0 wt % to 0.2 wt % unavoidable impurities. In yet other exemplary embodiments, the aluminum alloy compositions can comprise, consist essentially of, or consist of 6.6 wt % copper, 0.48 wt % manganese, 0.18 wt % zirconium, 0.21 wt % titanium, less than 0.2 wt % silicon, less than 0.2 wt % iron, less than 0.01 wt % nickel, less than 0.01 wt % magnesium, less than 0.1 wt % cobalt, less than 0.1 wt % antimony, with aluminum making up the balance, along with 0 wt % to 0.2 wt % unavoidable impurities. In yet other exemplary embodiments, the aluminum alloy compositions can comprise, consist essentially of, or consist of 6.5 wt % copper, 0.1 wt % to less than 0.2 wt % manganese, 0.15 wt % zirconium, greater than 0.2 wt % and up to 0.3 wt % titanium, and 85-93 wt % aluminum. In yet other exemplary embodiments, the aluminum alloy compositions can comprise, consist essentially of, or consist of 7.3 wt % copper, 0.48 wt % manganese, 0.19 wt % zirconium, greater than 0.0006 wt % magnesium, 0.07 wt % iron, 0.08 wt % silicon, and 91.8 wt % aluminum. In yet other exemplary embodiments, the aluminum alloy compositions can comprise, consist essentially of, or consist of 8 wt % copper, 0.48 wt % manganese, 0.19 wt % zirconium, greater than 0.0006 wt % magnesium, 0.07 wt % iron, 0.08 wt % silicon, and 91.4 wt % aluminum.

In one embodiment, the aluminum alloy composition comprises, consists essentially of, or consists of >8 wt % to 25 wt % copper, 0.4-0.5 wt % manganese, 0.1-0.3 wt % zirconium, 0.1 wt % titanium added via a grain refiner, less than 0.2 wt % silicon, less than 0.2 wt % iron, less than 0.01 wt % nickel, less than 0.01 wt % magnesium, less than 0.1 wt % cobalt, less than 0.1 wt % antimony, with aluminum making up the balance, along with 0.02-0.033 wt % boron and/or 0.025 wt % carbon from the grain refiner, and 0 wt % to 0.2 wt % unavoidable impurities. In an independent embodiment, the aluminum alloy compositions can comprise, consist essentially of, or consist of 8-15 wt % copper, 0.4-0.5 wt % manganese, 0.15-0.25 wt % zirconium, less than 0.05 wt % titanium, ≤0.1 wt % silicon, less than 0.2 wt % iron, less than 0.01 wt % nickel, less than 0.01 wt % magnesium, less than 0.1 wt % cobalt, less than 0.1 wt % antimony, with aluminum making up the balance, along with 0 wt % to 0.2 wt % unavoidable impurities. In another independent embodiment, the aluminum alloy compositions can comprise, consist essentially of or consist of 8-25 wt % copper, 0.05-1 wt % manganese, 0.05-0.3 wt % zirconium, 0-0.045 wt % titanium, ≤0.1 wt % silicon, 0-0.1 wt % iron, 0-0.01 wt % nickel, 0-0.01 wt % magnesium, 0-0.1 wt % cobalt, 0-0.1 wt % antimony, with aluminum making up the balance, along with 0 wt % to 0.2 wt % unavoidable impurities. In another independent embodiment, the aluminum alloy compositions can comprise, consist essentially of, or consist of 8-15 wt % copper, 0.45 wt % manganese, 0.2 wt % zirconium, ≤0.03 wt % titanium, less than 0.2 wt % silicon, less than 0.2 wt % iron, less than 0.01 wt % nickel, less than 0.01 wt % magnesium, less than 0.1 wt % cobalt, less than 0.1 wt % antimony, with aluminum making up the balance, along with 0 wt % to 0.2 wt % unavoidable impurities. In another independent embodiment, the aluminum alloy compositions can comprise, consist essentially of, or consist of 8.5-15 wt % copper, 0.45 wt % manganese, 0.2 wt % zirconium, 0.02-0.2 wt % titanium, less than 0.2 wt % silicon, less than 0.2 wt % iron, less than 0.01 wt % nickel, less than 0.01 wt % magnesium, less than 0.1 wt % cobalt, less than 0.1 wt % antimony, with aluminum making up the balance, along with 0.004 wt % to 0.067 wt % boron or 0.005 wt % to 0.05 wt % carbon, and 0 wt % to 0.2 wt % unavoidable impurities. In another independent embodiment, the aluminum alloy compositions can comprise, consist essentially of, or consist of 8.5-15 wt % copper, 0.45 wt % manganese, 0.2 wt % zirconium, 0.1 wt % titanium, less than 0.2 wt % silicon, less than 0.2 wt % iron, less than 0.01 wt % nickel, less than 0.01 wt % magnesium, less than 0.1 wt % cobalt, less than 0.1 wt % antimony, with aluminum making up the balance, along with 0.02 wt % to 0.033 wt % boron or 0.025 wt % carbon, and 0 wt % to 0.2 wt % unavoidable impurities. In another independent embodiment, the aluminum alloy compositions can comprise, consist essentially of, or consist of 9-15 wt % copper, 0.45 wt % manganese, 0.2 wt % zirconium, 0.02-0.2 wt % titanium, less than 0.2 wt % silicon, less than 0.2 wt % iron, less than 0.01 wt % nickel, less than 0.01 wt % magnesium, less than 0.1 wt % cobalt, less than 0.1 wt % antimony, with aluminum making up the balance, along with 0.004 wt % to 0.067 wt % boron or 0.005 wt % to 0.05 wt % carbon, and 0 wt % to 0.2 wt % unavoidable impurities. In another independent embodiment, the aluminum alloy compositions can comprise, consist essentially of, or consist of 9-15 wt % copper, 0.45 wt % manganese, 0.2 wt % zirconium, 0.1 wt % titanium, less than 0.2 wt % silicon, less than 0.2 wt % iron, less than 0.01 wt % nickel, less than 0.01 wt % magnesium, less than 0.1 wt % cobalt, less than 0.1 wt % antimony, with aluminum making up the balance, along with 0.02 wt % to 0.033 wt % boron or 0.025 wt % carbon, and 0 wt % to 0.2 wt % unavoidable impurities.

In contrast to conventional alloy compositions, which incorporate fine strengthening precipitates, the aluminum alloy compositions described herein comprise coarse strengthening precipitates that remain stable and coherent with the matrix at high temperatures, such as temperatures above 250° C. (e.g., 350° C.). Unlike fine strengthening precipitate alloy compositions that exhibit good mechanical properties at lower temperature but that coarsen rapidly at temperatures above 250° C. and lose their coherency with the matrix, the disclosed alloy compositions are able to perform and remain stable at temperatures well above 250° C. Without being limited to a single theory of operation, it is currently believed that the elevated temperature microstructural stability of the disclosed aluminum alloys is attributable to the selective microsegregation of alloying elements in the bulk as well as coherent/semi-coherent interfaces of θ' precipitates. It is also currently believed that this microsegregation can "freeze" the precipitates into low energy states that renders them exceptionally stable to thermal exposure at high temperatures, such as temperatures between 250° C. to 350° C., or higher. In particular disclosed embodiments, the microstructural stability exhibited by the disclosed alloy compositions can be obtained by reducing the amount of silicon present in the alloy to an amount less than 0.1 wt % of the alloy and/or by using heat treatment methods disclosed herein. The structural characteristics of the aluminum alloys disclosed herein can be evaluated by determining the presence of coarse but high-aspect-ratio strengthening precipitates of the disclosed alloys using, for example, TEM analysis, HRTEM analysis, SEM analysis, or a combination thereof. In yet additional embodiments, an alloy can be evaluated using inductively coupled plasma mass spectrometry to determine the amount and identity of the compositional components present in a constructed alloy-containing product. In some embodiments, the alloy compositions exhibit precipitates having diameters ranging from 100 nm to 1.2 μm and a thickness ranging from 5 nm to 30 nm, such as 8 nm to 10 nm. In particular disclosed embodiments, the thickness should not be higher than 40-50 nm. In some additional embodiments, the aspect ratio of the precipitates of the alloy compositions can be ≥20 or ≥30, such as within a range from 20 to 40 or within a range of from 30 to 40.

Once a minimum critical size is exceeded in the platelets during growth (a size which is targeted by design of both composition and heat treatment), the precipitates exhibit minimum coarsening. The short axis, which is the primary growth front for the platelets, is semi-coherent and has low mobility when the appropriate elements microsegregate to this interface. Also, while the mechanical properties of the 206-type alloy exceed those of the other representative alloys up to 200° C., due to the presence of the typically-targeted fine strengthening precipitates, the 206-type alloy's mechanical strength decreases rapidly at temperatures higher than 200° C. These results corroborate that the fine strengthening precipitates of the 206-type alloy are not stable and thus coarsen rapidly above 200° C., whereas the representative alloys, made by the processes disclosed herein, maintain their mechanical strength at temperatures above 200° C.

Aluminum alloy compositions disclosed herein also exhibit improved hot tearing susceptibility as compared to other aluminum alloy compositions, such as 206-type alloys, 319 alloys, 356 alloys, and RR350 alloys. In particular disclosed embodiments, the hot tearing susceptibility of an alloy composition, as described herein, can be measured by making a plurality of castings of an aluminum alloy composition in a particular shape, such as that illustrated in FIG. 1, and determining a hot tearing index value as described herein. A particular number of castings can be poured for each alloy composition to be evaluated, such as 3 to 10 castings, or 3 to 8 castings, or 3 to 5 castings. A total hot tearing index value is calculated for each casting and the average rating can be calculated. A lower number, according to this type of evaluation scheme, indicates lower susceptibility to hot tearing (thus indicating resistance to hot tearing). In some embodiments, hot tearing susceptibility can depend on the shape of the alloy casting being tested. In particular disclosed embodiments, an average hot tearing value of no more than 2.5, such as an average hot tearing value of 0.25 to 2.5, 0.5 to 2.25, or 0.5 to 2 can correspond to a desirable hot tearing susceptibility. The hot tearing values exhibited by aluminum alloy compositions described herein are lower than those for an industry standard alloy, such as 319 alloys, which exhibits hot tearing values greater than 2.5 in the same test.

IV. Methods of Making Alloy Compositions

The aluminum alloy compositions described herein can be made according to the following methods. In particular disclosed embodiments, the aluminum alloy compositions described herein can be made by combining cast aluminum alloy precursors with pre-melted alloys that provide high melting point elements. The cast aluminum alloy precursors are melted inside a reaction vessel (e.g., graphite crucible or large-scale vessel). The pre-melted alloys are prepared by arc-melting in advance. The reaction vessel is retained inside a box furnace at, for example, 775° C., with Ar cover gas for a suitable period of time (e.g., 30 minutes or longer). The melted Al alloys are then poured into a steel mold pre-heated, e.g., pre-heated at 300° C. Prior to the pouring, the molten metal inside the crucible is stirred by using a graphite rod pre-heated at 300° C., to verify that all elements or pre-melted alloys were fully dissolved into the liquid. In some embodiments, the alloy can be exposed to heat treatments such as solution annealing, solution heat treatment, quenching (typically water quenching), aging, pre-conditioning, and any combination thereof. The temperature during a heat treatment can be monitored by a thermo-couple attached to the material surface. Vickers hardness of the heat-treated materials can be measured on the cross-sectional surface at 5-kg load. The average hardness data obtained from 10 indents can be used as a representative of each annealing condition.

In some embodiments, the method can include heating the compositional components under a solution heat treatment procedure at a temperature ranging from 525° C. to 540° C. After the solution heat treatment, the alloy can be aged at a temperature ranging from 150° C. to 300° C., such as from 150° C. to less than 210° C., 150° C. to 190° C., 210° C. to 300° C., or 225° C. to 300° C.

In some embodiments, a grain refiner (e.g., TiBor, TiB, or TiC) is added to the alloy prior to casting to provide a mixture of the alloy and the grain refiner. Advantageously, the mixture is poured into a pre-heated mold substantially immediately (e.g., less than 10 minutes) after adding the grain refiner. For example, the mixture may be poured into the pre-heated mold within 1-5 minutes of adding the grain refiner, such as within 5 minutes, within 4 minutes, within 3 minutes, within 2 minutes, or within 1 minute of adding the grain refiner.

In particular disclosed embodiments, after the alloy has been exposed to a solution heat treatment and/or a quenching step, the alloy can be exposed to conditions sufficient to promote aging and, in some embodiments, hardening of the alloy. Because the alloy embodiments disclosed herein have unique microstructures that promote high temperature stability, the alloys can be exposed to new aging heat treatments that are not feasible for use with conventional alloys that do not have the unique microstructures.

In some embodiments, the conditions sufficient to promote aging can comprise exposing a quenched, casted alloy embodiment to an in situ aging process. In an in situ aging process, the cast alloy can be aged in situ during use, such as by using the cast alloy in a high temperature environment. Examples of high temperature environments that can be used for such in situ aging can include temperatures of 300° C. or higher, such as 305° C. to 400° C. (or higher), or 310° C. to 390° C. (or higher), or 325° C. to 350° C. (or higher). In such in situ embodiments, the alloy becomes aged when exposed to the high temperature environment during use and thus a separate pre-use aging step prior to use is not needed. In some embodiments, the method does not comprise a pre-use aging step, or is free of such a step. Such embodiments can be used when the alloy has a solutionized strength (in Vickers hardness) ranging from 80 kg/mm$^2$ to 100 kg/mm$^2$ (at a 5 kg load), such as 90 kg/mm$^2$. When the alloy is in use, it can be locally aged and strengthened. Solely by way of example, such in situ aged alloys can be used as cylinder heads in automobiles and/or gasoline pistons, which typically are exposed to high temperature environments, such as environments seeing temperatures of 300° C. to 350° C.

In additional embodiments, conditions sufficient to promote aging can comprise exposing a cast alloy to a short term aging treatment. As such, standard aging treatments, which typically require aging for at least one hour at temperatures ranging from 160° C. to 240° C., can be eliminated. The cast alloy instead can be aged at shorter time intervals and at higher temperatures, thereby reducing cost and increasing efficiency when producing alloy components. In embodiments using a short term aging treatment, the cast alloy can be exposed to temperatures ranging from 290° C. to 375° C. (or higher, such as 400° C.), such as 290° C. to 350° C., or 300° C. to 350° C. The cast alloy typically is exposed to a temperature within such ranges for a time period sufficient to achieve sufficient hardness, which can constitute a hardness that is within 10% to 20% of the alloy's highest hardness. In some embodiments, the cast alloy is exposed to the appropriate temperature for a time period ranging from 10 minutes to 60 minutes, such as 15 minutes to 60 minutes, or 15 minutes to 45 minutes, or 15 minutes to 30 minutes. In such embodiments, the alloy can retain a stable microstructure that is resistant to further aging, residual stress, dimensional tolerance issues, or any combination thereof. In representative embodiments, the cast alloy can be exposed to a temperature of 350° C. for 15 minutes.

In yet additional embodiments, conditions sufficient to promote aging can comprise exposing a cast alloy to an incremental aging treatment. In such embodiments, the cast alloy is exposed to increasing temperatures over a period of time. In some embodiments, alloy embodiments exposed to an incremental aging treatment exhibit improved hardness as compared to alloy embodiments that are only exposed to a single temperature for a single time period. In some embodiments, the incremental aging treatment can comprise exposing the cast alloy to an initial temperature ranging from 150° C. to 190° C., such as 150° C., 160° C., 170° C., 180° C., or 190° C. After a suitable amount of time at this temperature, the temperature of the environment in which the cast alloy is located can be incrementally increased until the temperature reaches a final temperature range of 250° C. or higher, such as 250° C. to 350° C., or 270° C. to 325° C., or 275° C. to 300° C. In some embodiments, the temperature can be incrementally increased such that the cast alloy is exposed to the incrementally increasing temperature for a total time period ranging from 4 hours to 6 hours, such as 4 hours, 5 hours, or 6 hours. The total time as well as time at each temperature increment can vary from alloy to alloy depending on the aging behavior of the alloy. In some embodiments, the alloy is held at its phase transition temperature for the longest period of time used in the incremental aging treatment. In subsequent heat increments, the time spent at each temperature can be sequentially decreased as the temperature is sequentially increased. In some embodiments, the temperature can be incrementally increased by increasing the temperature of the surrounding environment by 10° C. to 30° C., such as 15° C. to 25° C. every, or 15° C. to 20° C. The time spent at each increased temperature increment can be decreased as the temperature is increased. In some embodiments, the time the alloy is held at each temperature increment can be decreased by 5 minutes to 30 minutes, such as by 5 minutes to 20 minutes, or 5 minutes to 15 minutes. In some embodiments, the time the alloy is held at each temperature increment can be the same or different as any other time at which the alloy is held at a prior temperature increment.

In yet additional embodiments, the incremental aging treatment can comprise exposing the cast alloy to a first temperature within a first temperature range for a first time period and then exposing the cast alloy to a second temperature within a second temperature range that is higher than the first temperature range for a second time period. In some embodiments, the first temperature can include temperatures ranging from 150° C. to 230° C., such as 150° C. to 220° C., or 150° C. to 210° C., or 150° C. to 200° C. The first time period can range from 4 hours to 6 hours, such as 4 hours, 5 hours, or 6 hours. In some embodiments, the second temperature can include temperatures ranging from 250° C. to 400° C., such as 250° C. to 350° C., or 250° C. to 325° C., or 250° C. to 300° C. The second time period can range from 4 hours to 6 hours, such as 4 hours, 5 hours, or 6 hours. In particular embodiments, the cast alloy is exposed to a first temperature ranging from 150° C. to 200° C., such as 200° C., for a time period of 5 hours. The temperature of the environment in which the cast alloy is present is then increased to a second temperature ranging from 250° C. to 350° C. and the cast alloy is exposed to this temperature for a time period of 5 hours.

In yet additional embodiments, conditions sufficient to promote aging can comprise exposing a cast alloy to a multi-temperature aging treatment. In such embodiments, a cast alloy component comprising the aluminum alloy disclosed herein can be exposed to different temperatures simultaneously or sequentially. For example, the cast alloy can be exposed to a first temperature and then a selected portion of the cast alloy can be exposed to a different temperature that typically is higher than the first temperature. In particular embodiments, the selected portion of the cast alloy that is exposed to the different temperature is a portion of the cast alloy that will be exposed, during use, to conditions requiring improved elevated temperature stability (e.g., environments and/or operating conditions that involve high temperatures, such as temperatures above 250° C.). Solely by way of example, valve bridge regions of combustion chambers in cylinder heads often are exposed to operating conditions that result in the component being exposed to temperatures above 250° C. As such, these particular valve bridge regions benefit from having improved elevated temperature stability, whereas other portions of a combustion chamber in a cylinder head do not require such stability. By exposing only the selected portion of the component to the different (typically, higher) temperature, the complexity and cost of the aging treatment process can be reduced. In particular embodiments, the first temperature to which the cast alloy is exposed in a multi-temperature aging treatment can be a temperature ranging from 150° C. to 200° C., such as 160° C. to 190° C., or 180° C. to 190° C. The entire cast alloy can be exposed to this temperature. In some embodiments, the entire cast alloy can be exposed to this temperature for a time period ranging from 4 to 6 hours, such as 4 hours, 5 hours, or 6 hours. In some embodiments, a selected portion (e.g., a local portion) of the cast alloy simultaneously is exposed to a second, higher temperature, such as a temperature ranging from 250° C. to 350° C., or 275° C. to 325° C., or 290° C. to 300° C. The selected portion of the cast alloy can simultaneously be exposed to this second, higher temperature by directing air of the second, higher temperature at the selected portion (e.g., local portion) of the alloy while the entire cast alloy is being heated at the lower temperature. For example, forced convective heat transfer can be used to direct the elevated temperature air at the selected portion (e.g., local portion) of the alloy.

Method embodiments using a multi-temperature aging treatment can be used to prepare an alloy component that comprises different microstructural zones within the same component. For example, an alloy exposed to a multi-temperature aging treatment can comprise a first microstructural zone that is located within the portion of the alloy that is only exposed to the first temperature and can further comprise a second (or third or fourth, etc.) microstructural zone that is located within the portion of the alloy that is exposed to the second temperature. In particular embodiments, the portion of the alloy that is exposed to the first temperature (such as when the first temperature ranges from 150° C. to 200° C.) can comprise a microstructural zone that comprises a fine, high strength microstructure. In such embodiments, the portion of the alloy that is exposed to the second temperature (such as when the second temperature is a higher temperature than the first temperature) comprises a coarse, stable microstructure as described herein.

The method steps described above are scalable and therefore are suitable for industrial scale methods.

V. Methods of Use

The aluminum alloy compositions disclosed herein can be used in applications using cast aluminum compositions. The aluminum alloy compositions are suitable for use in myriad components requiring cast aluminum alloy structures, with exemplary embodiments including, but not being limited to, automotive powertrain components (such as engine cylinder heads, blocks, pistons, water cooled turbocharger manifolds, and other automotive components), aerospace components, heat exchanger components, or other components requiring stable aluminum-containing compounds at high temperatures. In particular disclosed embodiments, the disclosed aluminum alloy compositions can be used to make cylinder heads or engine blocks for internal combustion engines and are particularly useful for components having ornamental shapes or details.

Some embodiments of the disclosed aluminum alloy compositions do not include a grain refiner. Such embodiments may be suitable for casting as described above, but also are suitable in other forms and/or for other uses, such as additive manufacturing, alloy powders, welding/fusion joining, and laser cutting/welding.

VI. Overview of Several Embodiments

Disclosed herein are embodiments of a method, comprising: exposing an aluminum alloy comprising >7 wt % to 25 wt % copper, 0.05 wt % to 0.3 wt % zirconium, 0.05 wt % to 0.5 wt % manganese, less than 0.1 wt % silicon, and aluminum to an aging heat treatment selected from (a) an in situ aging treatment wherein the aluminum alloy is aged during use in a high temperature environment having a temperature ranging from 305° C. to 400° C.; (b) a short term aging treatment wherein the aluminum alloy is aged at a temperature ranging from 290° C. to 375° C. for a time period of less than five hours; (c) an incremental aging treatment wherein the aluminum alloy is aged by exposing the aluminum alloy to increasing temperatures over a period of time; (d) a multi-temperature aging treatment wherein the aluminum alloy is exposed to different temperatures simultaneously; or (e) any combination of (a) through (d).

In some embodiments, the method further comprises solution treating the aluminum alloy at a temperature ranging from 525° C. to 550° C.

In any or all of the above embodiments, the method further comprises: adding a grain refiner comprising titanium to the aluminum alloy to provide a mixture; and pouring the mixture into a mold within 5 minutes of adding the grain refiner. In some such embodiments, the mold is pre-heated.

In any or all of the above embodiments, the aluminum alloy is exposed to a solution treatment prior to the in situ treatment and wherein the aluminum alloy has a solutionized strength ranging from 80 kg/mm$^2$ to 100 kg/mm$^2$ at a 5 kg load.

In any or all of the above embodiments, the aluminum alloy is exposed to the short term aging treatment and wherein the short term aging treatment comprises exposing the aluminum alloy to a temperature ranging from 300° C. to 350° C. for 15 minutes to 60 minutes.

In any or all of the above embodiments, the aluminum alloy is exposed to the incremental aging treatment and wherein the incremental aging treatment comprises exposing the aluminum alloy to an initial temperature ranging from 150° C. to 190° C. and then incrementally increasing the temperature to a final temperature ranging from 250° C. to 350° C. In some such embodiments, the temperature is incrementally increased by increasing the temperature of an environment in which the aluminum alloy is present by 10° C. to 30° C. for period of time that decreases each time the temperature of the environment is increased.

In any or all of the above embodiments, the aluminum alloy is exposed to the incremental aging treatment and wherein the incremental aging treatment comprises exposing the aluminum alloy to a first temperature ranging from 150° C. to 230° C. and then exposing the aluminum alloy to a second temperature ranging from 250° C. to 400° C. In some such embodiments, the first temperature ranges from 150° C. to 200° C. and the second temperature ranges from 250° C. to 350° C.

In any or all of the above embodiments, the aluminum alloy is exposed to the multi-temperature aging treatment and wherein the multi-temperature aging treatment comprises exposing the aluminum alloy to a first temperature and a second temperature that is higher than the first temperature simultaneously. In some such embodiments, the first temperature ranges from 150° C. to 200° C. and the second temperature ranges from 250° C. to 350° C. In yet additional embodiments, the second temperature is provided by directing air having the second temperature at the aluminum alloy using forced convective heat transfer.

In any or all of the above embodiments, the aluminum alloy comprises >8 wt % to 25 wt % copper; 0.05 wt % to 0.3 wt % zirconium; 0.05 wt % to 1 wt % manganese; ≤0.1 wt % silicon; and aluminum.

In any or all of the above embodiments, the aluminum alloy comprises 0 wt % to less than 0.05 wt % titanium.

In any or all of the above embodiments, the aluminum alloy comprises strengthening precipitates having an aspect ratio ≥20.

Also disclosed herein are embodiments of a method for making an alloy, comprising: combining >7.3 wt % to 25 wt % copper, 0.05 wt % to 0.3 wt % zirconium, 0.05 wt % to 0.5 wt % manganese, ≤0.1 wt % silicon, ≤0.1 wt % iron, ≤0.01 wt % magnesium, and aluminum to form a composition; solution treating the composition at a temperature ranging from 525° C. to 550° C.; quenching the composition; and age treating the composition by using an aging heat treatment selected from (a) an in situ aging treatment wherein the aluminum alloy is aged during use in a high temperature environment having a temperature ranging from 305° C. to 400° C.; (b) a short term aging treatment wherein the aluminum alloy is aged at a temperature ranging from 290° C. to 375° C. for less than 5 hours; (c) an incremental aging treatment wherein the aluminum alloy is aged by exposing the aluminum alloy to increasing temperatures over a period of time; (d) a multi-temperature aging treatment wherein the aluminum alloy is exposed to different temperatures simultaneously; or (e) any combination of (a) through (d).

Also disclosed herein are embodiments of an aluminum alloy having a first microstructural zone comprising a fine microstructure and a second microstructural zone comprising a coarse microstructure. In some such embodiments, the aluminum alloy comprises >7 wt % to 25 wt % copper, 0.05 wt % to 0.3 wt % zirconium, 0.05 wt % to 0.5 wt % manganese, less than 0.1 wt % silicon, and aluminum.

In any or all of the above embodiments, the aluminum alloy further comprises iron, nickel, magnesium, cobalt, antimony, or a combination thereof.

VII. Examples

Example 1

Figure 2:
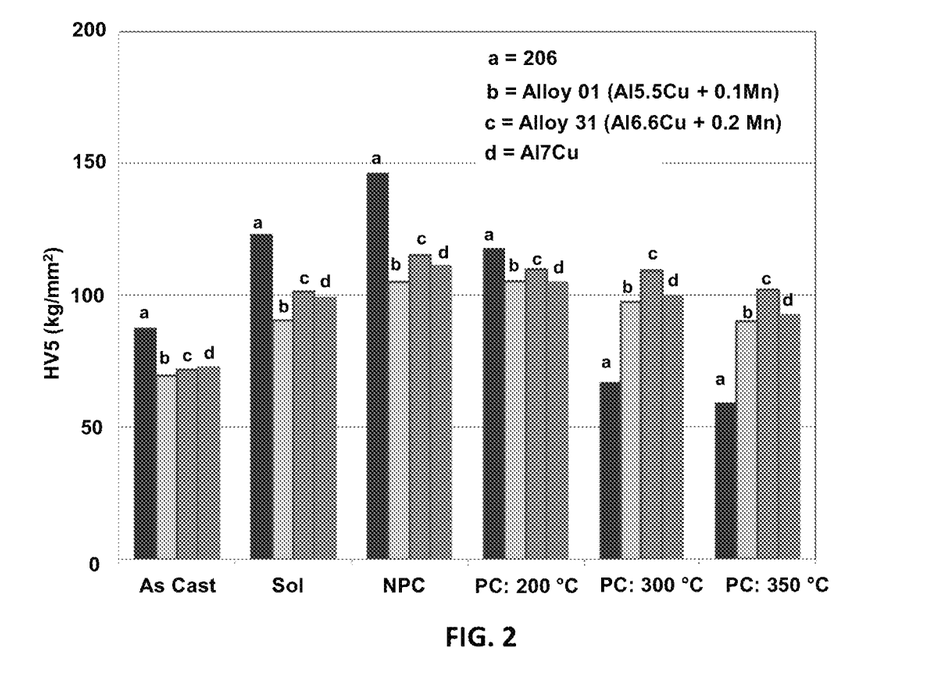
FIG. 2 is a bar graph of Vickers hardness as a function of different heat treatments as performed on various different alloy embodiments, including an A206 alloy (labeled as "a") and three representative alloys described herein (labeled as "b," "c," and "d").

In this example, alloys are prepared that comprise coarse and yet coherent θ' (metastable $Al_2Cu$) precipitates that enable improved elevated temperature (such as up to 350° C.) microstructural stability and mechanical properties. The exceptional high temperature stability of the microstructure is illustrated in FIG. 2. With reference to FIG. 2, room temperature Vickers Hardness (at 5 kg load) is plotted as a function of the different heat treatments (as cast, solutionized ["Sol"], no preconditioning ["NPC"], and three different pre-conditioning treatments ["PC"]) for four alloys: a 206 alloy (Al5Cu) and three different representative alloys (Al5.5Cu+0.1 Mn, Al6.6Cu+0.2 Mn, and Al7Cu). In this example, preconditioning refers to a 200 hour heat treatment of the alloy after the ageing treatment and data is illustrated in FIG. 2 for PC treatment at 200° C., 300° C., and 350° C. Three representative alloys are shown (labeled as "b," "c," and "d" in FIG. 2) and data for a 206 type commercial cast Al-5Cu alloy (labeled as "a" in FIG. 2) is also included for comparison. The exceptional elevated temperature response of the representative alloy embodiments is clearly observed through their nearly horizontal response up to 350° C. compared to the rapidly decreasing hardness of the 206 alloy. In some embodiments, the mechanical properties of the 206 alloy are superior up to 200° C., likely due to the presence of the typically-targeted fine strengthening precipitates, which are not stable and thus coarsen rapidly above 200° C. Alloy embodiments of the present disclosure, however, exhibit the favorable mechanism of high temperature stability and strengthening. In particular embodiments, the alloy comprises 3-25 wt % copper. Also in particular embodiments, the alloy comprises strengthening precipitates having an aspect ratio ≥20. In yet additional embodiments, the alloy exhibits an average hot tearing value ranging from 0.5 to 2.5. The unique microstructures of the alloy embodiments disclosed herein allow the design of unique heat treatments to take advantage of the elevated temperature stability of the strengthening precipitates in the Al Cu alloy system.

Example 2

In this example, two different alloy embodiments were evaluated. These alloys were exposed to different embodiments of conditions sufficient to promote aging. The alloy compositions are listed in Table 1.

TABLE 1

Composition of two alloys with 7.3 wt % Cu (14HT) and 8.0 wt % Cu (16HT) that were studied to design unique heat treatments pertaining to elevated temperature stable cast aluminum alloys.

| | Alloy (Weight %)* | | | | | |
|---|---|---|---|---|---|---|
| | Si (%) | Cu (%) | Mg (%) | Fe (%) | Mn (%) | Zr (%) |
| 14HT | 0.08 | 7.3 | 0.0006 | 0.07 | 0.48 | 0.19 |
| 16HT | 0.08 | 8.0 | 0.0006 | 0.07 | 0.48 | 0.19 |

*The balance wt % comprises aluminum and (optionally) any trace impurities disclosed herein.

Figure 3:
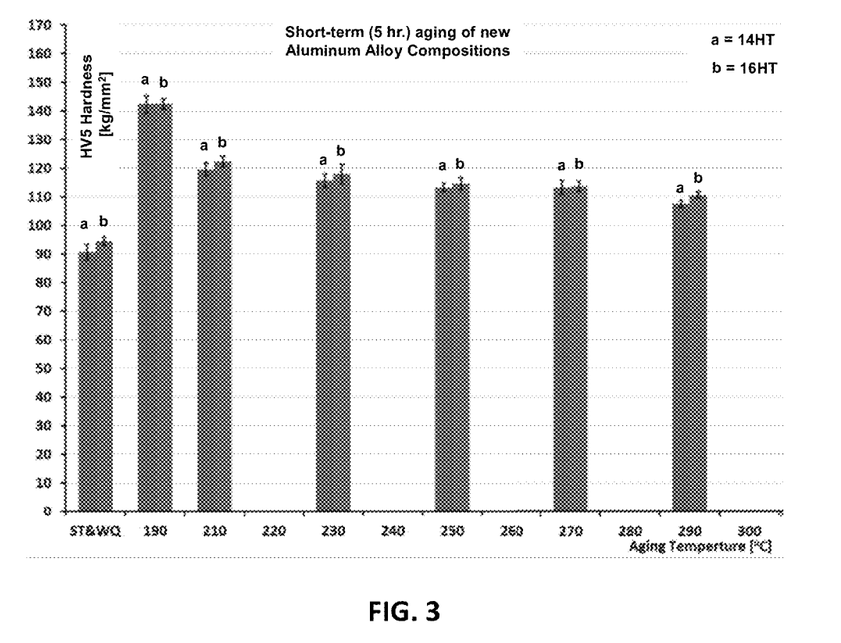
FIG. 3 is a bar graph of Vickers hardness as a function of aging temperature (° C.), which shows the effect of aging temperature on the hardness of two representative alloy embodiments described herein, wherein "ST&WQ" refers to solution treated and water quenched.

In this example, it was determined that the baseline as-aged hardness for the certain Al—Cu alloy embodiments disclosed herein is in the range of 100-110 kg/mm² HV5 for a range of copper levels (see FIGS. 2 and 3). The typical aging treatment for this alloy family involves exposing the alloy to a temperature of 240° C. for 5 hours. When the ageing temperature is lower (e.g. 190° C.), the as-aged hardness is higher (for example ~140 kg/mm2 HV5 for 14HT and 16HT), and even approaches that of alloy 206 (FIG. 2). It is shown in FIG. 2 that increasing the preconditioning (200 hour treatment) temperature to 350° C. leads to only a modest decrease in the HV5 value for the representative alloys to about 90 kg/mm². FIG. 3 shows the effect of ageing temperature on the hardness of two higher copper alloys 14HT (with 7.3 wt % Cu) and 16HT (with 8.0 wt % Cu) using an aging method embodiment wherein the alloy is exposed to different temperatures for a period of 5 hours. With reference to FIG. 3, "ST&WQ" refers to solution treated and water quenched.

Example 3

Figure 4:
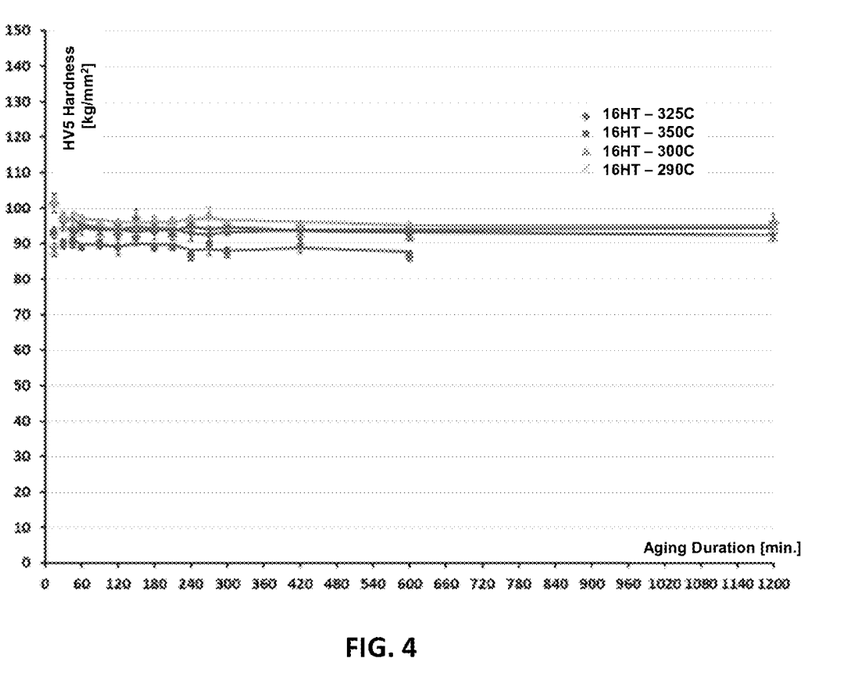
FIG. 4 is a graph of Vickers hardness as a function of aging duration (minutes), which shows aging curves for a representative alloy of the present disclosure at four different temperatures (290° C., 300° C., 325° C., and 350° C.).
Figure 5:
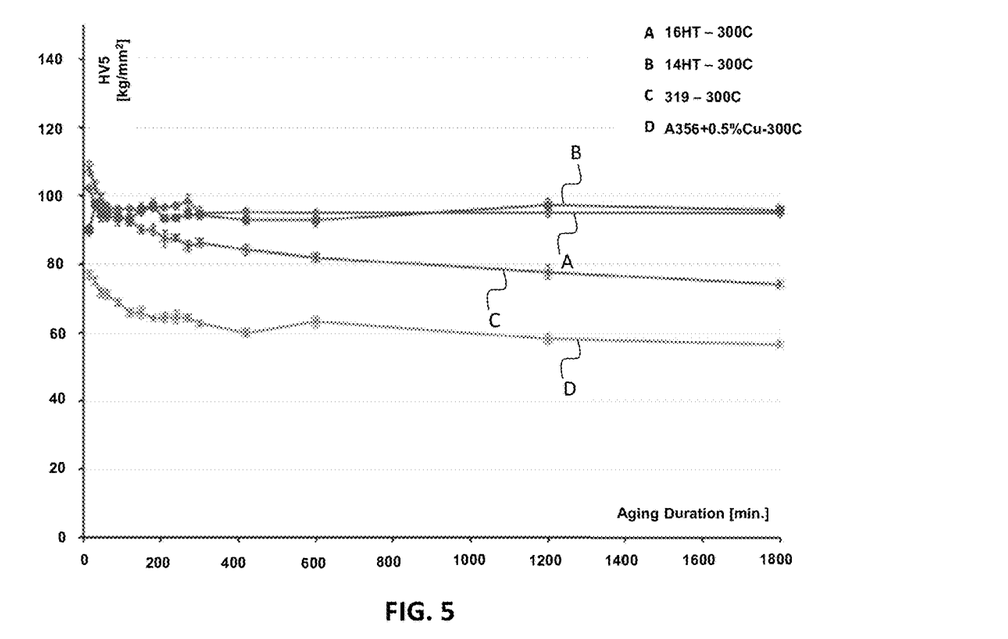
FIG. 5 is a graph of Vickers hardness as a function of aging duration (minutes), which shows the aging curves for two conventional alloys (A319 and A356+0.5Cu) and two representative alloys of the present disclosure, wherein aging was conducted at 300° C.

The unique characteristics of the ageing behavior of the new elevated temperature cast aluminum alloys are examined in this Example. FIG. 4 shows the ageing curves for 16HT cast aluminum alloys for four temperatures of 290° C., 300° C., 325° C., and 350° C. and reports ageing up to 20 hours after solutionizing and water quenching. As can be seen by FIG. 4, the alloy largely retains its hardness in the elevated temperature regime (90-100 HV5) as compared to the as-aged hardness (~110 HV5 after 5 hours at 240° C.) with only a modest reduction even at 350° C. Also to be noted is that there is no regime where these alloys are under-aged in this temperature regime and the alloys are within a few percent of their peak hardness within 15 minutes of the initiation of the ageing treatment. 300° C. ageing curves for commercial (319 and A356+0.5Cu) and representative aluminum alloys (14HT and 16HT) are shown in FIG. 5. The plot reports ageing up to 30 hours. The new high temperature aluminum alloys retain their hardness at this temperature whereas the conventional alloys (319 and A356+0.5Cu) have a continuous decrease in hardness with aging time at this temperature.

Example 4

Figure 6:
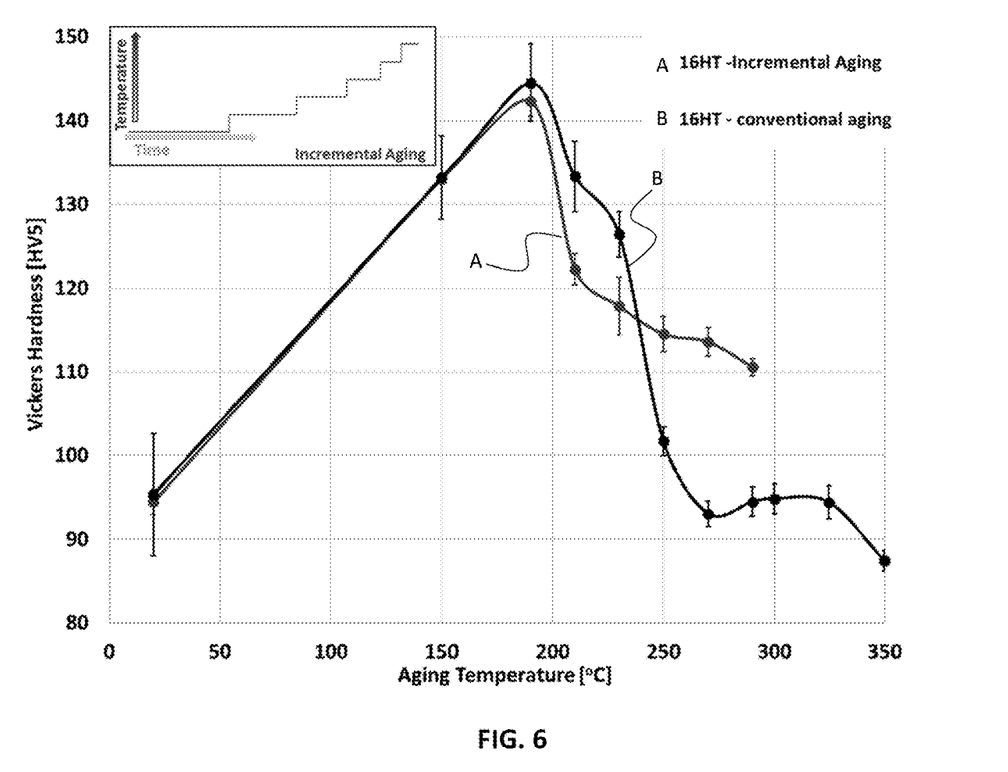
FIG. 6 is a graph of Vickers hardness as a function of temperature (° C.) and compares the effect of incremental aging versus standard aging on the hardness response of a representative alloy disclosed herein.
Figure 7:
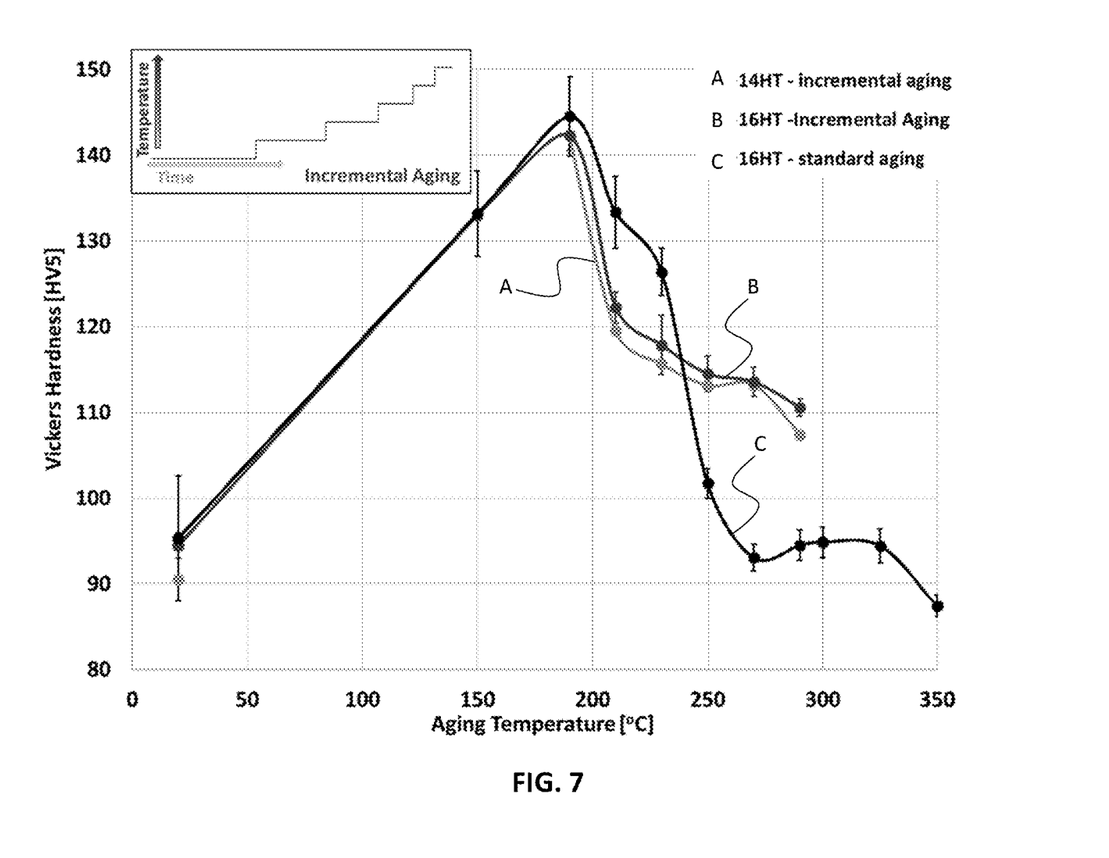
FIG. 7 is a graph of Vickers hardness as a function of temperature (° C.) and compares the effect of incremental aging versus standard aging on the hardness response of two different representative alloys disclosed herein.

In this example, an incremental ageing treatment where the 16HT alloy was aged for 5 hours at successively increasing temperature values was evaluated. The value of the hardness of this alloy at room temperature following an incremental ageing treatment is compared to the alloy with the standard ageing treatment in FIG. 6. As can be seen in FIG. 6, the alloy with an incremental ageing treatment has a ~20% higher Vickers hardness value at ageing temperatures above 250° C. Additional results are shown in FIG. 7, which is a graph that compares the effect of incremental aging on hardness of a 14HT alloy (curve "A") and a 16HT alloy (curve "B") when compared to a 16HT alloy that was aged conventionally (curve "C"). The conventionally-aged 14HT alloy's strength (or hardness) is consistently lower than conventionally aged 16HT alloy; however, the incrementally-aged 14HT has a higher strength than conventionally-aged 16HT at temperatures above 240° C.

Example 5

In another incremental aging embodiment, the alloy was exposed to a temperature of 190° C. for 1.5 hours. The temperature was then increased by 20° C. and the alloy was kept at the increased temperature for a suitable time period, such as those provided below. At higher temperatures, the microstructural changes occur faster and hence less time is required for certain precipitates of interest to form. Once past that transition temperature, the higher the temperature at the next step of incremental aging, the less time required to reach the desired outcome from each step. The alloy was never taken out of the oven during the incremental aging treatment until the process was complete.

| Temperature | Time |
|---|---|
| 190° C. | 1.5 hours |
| 210° C. | 1 hour |
| 230° C. | 45 minutes |
| 250° C. | 30 minutes |
| 270° C. | 20 minutes |
| 290° C. | 15 minutes |

In view of the many possible embodiments to which the principles of the present disclosure may be applied, it should be recognized that the illustrated embodiments are only preferred examples of the disclosure and should not be taken as limiting the scope of the claimed invention. Rather, the scope of the invention is defined by the following claims. We therefore claim as our invention all that comes within the scope and spirit of these claims.

We claim:

1. A method, comprising exposing an aluminum alloy comprising >7 wt % to 25 wt % copper, 0.05 wt % to 0.3 wt % zirconium, 0.05 wt % to 0.5 wt % manganese, less than 0.1 wt % silicon, and aluminum to an incremental aging treatment wherein the aluminum alloy is aged by exposing the aluminum alloy to a heated environment, wherein the temperature of the heated environment is (i) increased from a first temperature to a second temperature; (ii) held at the second temperature for a first hold time; (iii) increased from the second temperature to a third temperature higher than the first temperature and the second temperature, and (iv) held for a second hold time before a subsequent incremental temperature increase to a temperature higher than the third temperature, wherein the second hold time is shorter than the first hold time and wherein a hold time between any subsequent incremental temperature increase decreases each time the temperature of the heated environment is increased.

2. The method of claim 1, further comprising:
prior to the incremental aging, solution treating the aluminum alloy at a temperature ranging from 525° C. to 550° C.; adding a grain refiner comprising titanium to the aluminum alloy to provide a mixture and pouring the mixture into a pre-heated mold within 5 minutes of adding the grain refiner;
before or after the incremental aging, further exposing the alloy to a short term aging treatment wherein the aluminum alloy is aged at a temperature ranging from 290° C. to 375° C. for a time period of less than 60 minutes or less; and/or
exposing the alloy to a multi-temperature aging treatment wherein the entire aluminum alloy is exposed to a first temperature ranging from 150° C. and 200° C. except for a selected portion of the alloy which is locally exposed simultaneously to a second temperature that is higher than the first temperature.

3. The method of claim 1, wherein the first temperature ranges from 150° C. to 230° C. and the temperature of the heated environment is incrementally increased to a final temperature ranging from 250° C. to 400° C.

4. The method of claim 1, wherein the first temperature ranges from 150° C. to 200° C. and the second temperature ranges from 250° C. to 350° C.

5. The method of claim 1, wherein the aluminum alloy comprises >8 wt % to 25 wt % copper; 0.05 wt % to 0.3 wt % zirconium; 0.05 wt % to 1 wt % manganese; ≤0.1 wt % silicon; and aluminum.

6. The method of claim 1, wherein the aluminum alloy comprises 0 wt % to less than 0.05 wt % titanium.

7. The method of claim 1, wherein the aluminum alloy comprises strengthening precipitates having an aspect ratio ≥20.

8. The method of claim 1, wherein the third temperature is increased to a fourth temperature that is higher than the third temperature and is held for a third hold time that is shorter than the first hold time and the second hold time.

9. A method, comprising exposing an aluminum alloy comprising >7 wt % to 25 wt % copper, 0.05 wt % to 0.3 wt % zirconium, 0.05 wt % to 0.5 wt % manganese, less than 0.1 wt % silicon, and aluminum to an incremental aging treatment wherein the aluminum alloy is aged by exposing the aluminum alloy to a heated environment, wherein the temperature of the heated environment is incrementally increased from a first temperature by 10° C. to 30° C. to a resulting increased second temperature and held at the increased second temperature for a hold time before increasing the temperature of the heated environment to a third temperature that is higher than the first temperature and the second temperature and holding at the increased third temperature for a hold time, and wherein at least one subsequent temperature increase is followed by a subsequent hold time, wherein the time period of each subsequent hold time decreases relative to each prior hold time.

10. The method of claim 9, further comprising:
prior to the incremental aging, solution treating the aluminum alloy at a temperature ranging from 525° C. to 550° C.; adding a grain refiner comprising titanium to the aluminum alloy to provide a mixture and pouring the mixture into a pre-heated mold within 5 minutes of adding the grain refiner;
before or after the incremental aging, exposing the alloy to a short term aging treatment wherein the aluminum alloy is aged at a temperature ranging from 290° C. to 375° C. for a time period of less than 60 minutes or less; and/or
exposing the alloy to a multi-temperature aging treatment wherein the entire aluminum alloy is exposed to a first temperature ranging from 150° C. and 200° C., except for a selected portion of the alloy which is locally exposed simultaneously to a second temperature that is higher than the first temperature.

11. The method of claim 9, wherein the aluminum alloy comprises strengthening precipitates having an aspect ratio ≥20, and wherein:
(a) the aluminum alloy comprises >8 wt % to 25 wt % copper; 0.05 wt % to 0.3 wt % zirconium; 0.05 wt % to 1 wt % manganese; ≤0.1 wt % silicon; and aluminum; or
(b) the aluminum alloy comprises >7.3 wt % to 25 wt % copper, 0.05 wt % to 0.3 wt % zirconium, 0.05 wt % to 0.5 wt % manganese, ≤0.1 wt % silicon, ≤0.1 wt % iron, ≤0.01 wt % magnesium, and aluminum.

12. The method of claim 9, wherein the aluminum alloy comprises 0 wt % to less than 0.05 wt % titanium.

13. The method of claim 9, wherein the first temperature ranges from 150° C. to 230° C. and the second temperature ranges from 250° C. to 400° C.

14. A method, comprising exposing an aluminum alloy comprising >7 wt % to 25 wt % copper, 0.05 wt % to 0.3 wt % zirconium, 0.05 wt % to 0.5 wt % manganese, less than 0.1 wt % silicon, and aluminum to a multi-temperature aging treatment wherein the entire aluminum alloy is exposed to a first temperature ranging from 150° C. and 200° C., except for a selected portion of the alloy which is locally exposed simultaneously to a second temperature that is higher than the first temperature.

15. The method of claim 14, wherein the second temperature ranges from 250° C. to 350° C.

16. The method of claim 14, wherein the second temperature is provided by directing air having the second temperature at the selected portion of the aluminum alloy using forced convective heat transfer.

17. The method of claim 14, further comprising:
solution treating the aluminum alloy at a temperature ranging from 525° C. to 550° C.;
adding a grain refiner comprising titanium to the aluminum alloy to provide a mixture and pouring the mixture into a pre-heated mold within 5 minutes of adding the grain refiner;

exposing the alloy to a short term aging treatment wherein the aluminum alloy is aged at a temperature ranging from 290° C. to 375° C. for a time period of less than 60 minutes or less.

18. The method of claim 14, wherein the aluminum alloy comprises strengthening precipitates having an aspect ratio ≥20, and wherein:
   (a) the aluminum alloy comprises >8 wt % to 25 wt % copper; 0.05 wt % to 0.3 wt % zirconium; 0.05 wt % to 1 wt % manganese; 0.1 wt % silicon; and aluminum; 0 wt % to less than 0.05 wt % titanium; or
   (b) the aluminum alloy comprises >7.3 wt % to 25 wt % copper, 0.05 wt % to 0.3 wt % zirconium, 0.05 wt % to 0.5 wt % manganese, ≤0.1 wt % silicon, ≤0.1 wt % iron, ≤0.01 wt % magnesium, and aluminum.

19. The method of claim 14, wherein the aluminum alloy comprises 0 wt % to less than 0.05 wt % titanium.

* * * * *